United States Patent [19]

Fleischmann

[11] 4,108,422
[45] Aug. 22, 1978

[54] ARRANGEMENT FOR SUPPORTING A RAILING AND THE LIKE

[75] Inventor: Horst Fleischmann, Munich, Fed. Rep. of Germany

[73] Assignee: Gebrüder Kömmerling Kunststoffwerke GmbH, Pirmasens, Fed. Rep. of Germany

[21] Appl. No.: 790,139

[22] Filed: Apr. 22, 1977

[30] Foreign Application Priority Data

Apr. 27, 1976 [DE] Fed. Rep. of Germany ....... 2618443

[51] Int. Cl.² ............................................. F16B 7/04
[52] U.S. Cl. ..................................... 256/67; 256/69; 403/187; 403/255
[58] Field of Search ....................... 256/67, 65, 69, 68; 403/187, 195, 199, 252, 254, 255, 297

[56] References Cited

U.S. PATENT DOCUMENTS

| 3,338,602 | 8/1967 | Arnd | 403/252 |
| 3,351,324 | 11/1967 | Blum et al. | 256/68 |
| 3,574,367 | 4/1971 | Jankowski | 403/297 |

Primary Examiner—Andrew V. Kundrat
Attorney, Agent, or Firm—Michael J. Striker

[57] ABSTRACT

An arrangement for supporting a railing provided with a T-shaped groove and a slot communicating with the groove comprises a hollow supporting member and a T-shaped clamping element. The clamping element includes two clamping members each of which members has a first portion insertable in the hollow of the supporting member and a second portion insertable in the T-shaped groove of the railing. The clamping members are movable relative to each other in the longitudinal direction of the supporting member. The first portions of the clamping members are elongated in a direction of elongation of the supporting member, whereas the second portions are formed as pin-shaped projections each having an axis. The pin-shaped second portion of one of the clamping members is offset relative to the pin-shaped second portion of the other clamping member in a direction transverse to the axes thereof and to the elongation of the first portion. Means are provided for spreading the clamping members apart from each other so as to clamp the first portions in the supporting member and to clamp the pin-shaped second portions in the T-shaped groove of the railing. The spreading means include one or two screws extending through holes provided in one of the clamping members and abutting against the other clamping member.

12 Claims, 1 Drawing Figure

U.S. Patent  Aug. 22, 1978  4,108,422
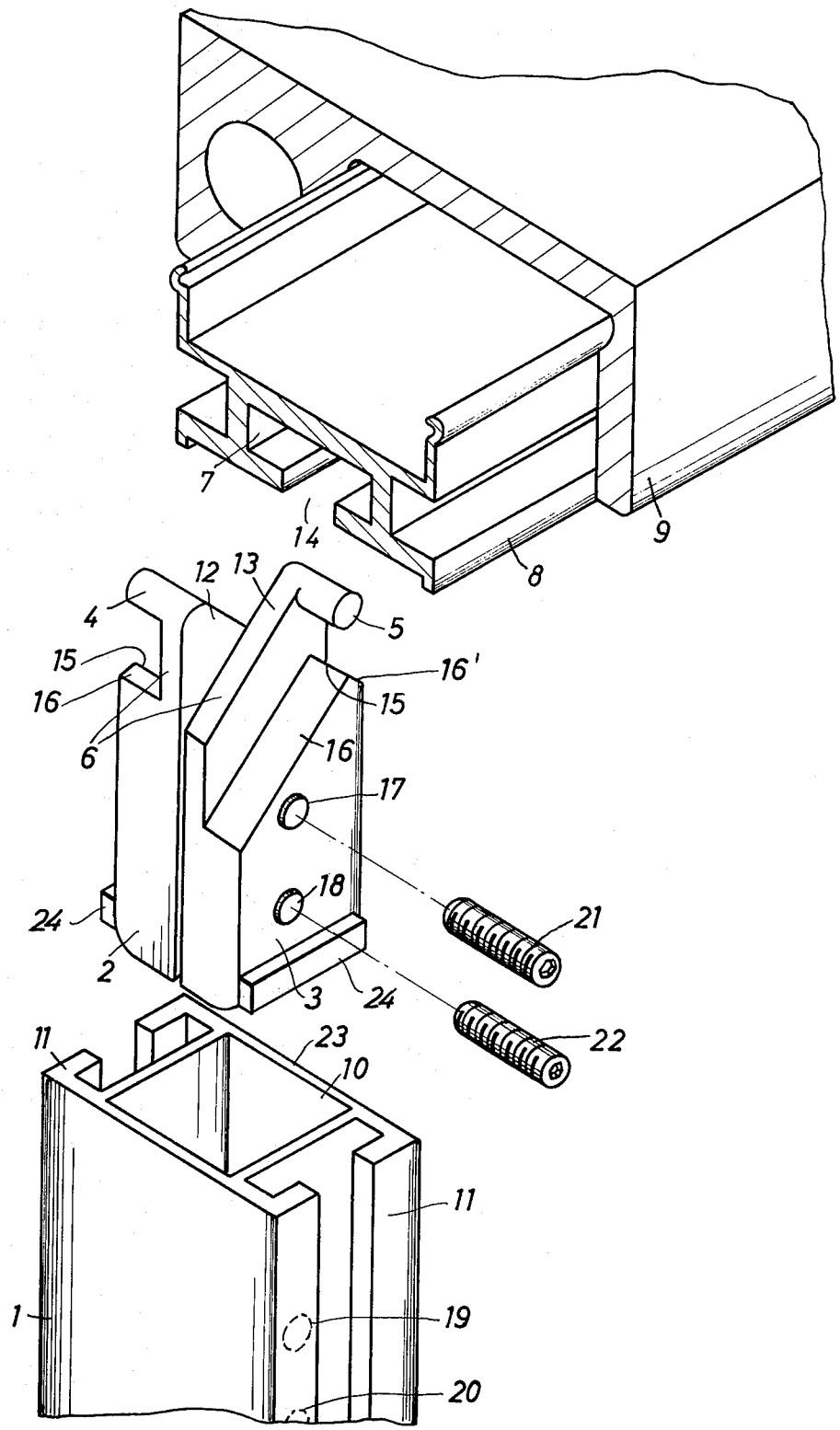

ARRANGEMENT FOR SUPPORTING A RAILING AND THE LIKE

BACKGROUND OF THE INVENTION

The present invention relates to an arrangement for supporting a railing and the like. More particularly, it relates to an arrangement for supporting such railing which includes a handrail and an inner beam provided with a T-shaped groove.

Arrangements for supporting railings have been proposed which comprise supporting members each having an upper end portion fully insertable in a T-shaped groove of a beam of a handrail. A slot of the groove in such construction has a width corresponding to the width of the supporting member in a direction transverse to the direction of elongation of the groove. A portion of the beam forming the slot of the T-shaped groove is in turn formed as an outwardly open groove. A self-tapping screw extends through a bottom portion of such outer groove and a respective wall of the hollow supporting member, whereby the beam is fixed to the supporting member. A through hole for the above screw particularly in the beam, in such connection, can be made, however, only directly at a mounting cite when neither an exact mounting position of the supporting member nor an inclination of the railing can be determined within substantially narrow limits. This constitutes an essential disadvantage of the prior art arrangements for supporting railings.

SUMMARY OF THE INVENTION

Accordingly, it is a general object of the present invention to provide an arrangement for supporting a railing which avoids the disadvantages of the prior art arrangements.

More particularly, it is an object of the present invention to provide an arrangement for supporting an elongated railing which can be mounted at any desirable location of a beam of the railing and permits any desirable inclination of the railing, and at the same time assures that a supporting member of the arrangement is reliably fixed to the beam.

Still another object of the present invention is to provide an arrangement for supporting an elongated railing which assures such mounting of the railing on a supporting member which does not require essential subsequent operations for compensating mounting and fabrication tolerances directly at the mounting cite.

In keeping with these objects, and with others which will become apparent hereinafter, one feature of the present invention is that the arrangement, in accordance with the invention, has a supporting member having a longitudinally extending inner hollow, a T-shaped clamping element including two clamping members each having a first portion insertable in the hollow of the supporting member and a pin-shaped second portion insertable in the T-shaped groove of the railing and having an axis. The first portions of the clamping members extend in a longitudinal direction of the hollow supporting member, and the clamping members are movable relative to each other in this direction. The pin-shaped second portion of one of the clamping members is offset relative to the pin-shaped second portion of the other clamping member in a direction transverse to the axes thereof and to the elongation of the first portions. Means are provided for spreading apart the clamping members so that the first portions of the latter are clamped in the supporting member and the second portions are clamped in the T-shaped groove of the beam of the railing. The spreading means include a screw which extends into the hollow of the supporting member and through a hole provided in one of the clamping members, and abuts against the other clamping member.

When the clamping members are in such a position in which they are not spread apart and located adjacent each other, the pin-shaped second portions extend parallel to and in opposite directions relative to each other. When the clamping members are spread apart, free end sections of the pin-shaped second portions are inclined at a respective angle relative to a marginal end section of the supporting element, which marginal end section passes at both sides of the slot of the groove below a C-shaped section of the beam forming the groove. In the latter case the beam and therefore the handrail are pressed against a front marginal section of the supporting member. Simultaneously with this, the clamping members are clamped in the supporting member so that a reliable clamping shape-closed connection of the handrail with the supporting member is provided.

Since the pin-shaped second portions of the clamping members are offset relative to each other in a direction transverse to the axes thereof and to the elongation of the first portion, that is in a direction of elongation of the groove, a force applied by the pin-shaped second portions to the beam acts in locations which are offset from each other in a direction of the elongation of the beam so that the latter is pressed against the front marginal section of the supporting member over a plane.

Since the clamping members are movable relative to each other in a direction of the elongation of the supporting member, the clamping element can be connected with the handrail when the latter is inclined at any desirable angle. This is assured by the fact that one clamping member of the clamping element together with its pin-shaped second portion can be inserted into the supporting member to a greater distance than the distance to which the other clamping member is inserted thereinto. No subsequent operations are required in this case.

At the same time, in this case deviations of an angle of inclination of a plane of the front marginal section of the supporting member relative to a lower face surface of the beam is allowable, since such deviations can be compensated by the above relative movement of the clamping members and their movement in a supporting member. In addition, very narrow tolerances for location of the front plane of the supporting member and the lower surface of the beam are not required.

A process of mounting of the handrail in such hollow supporting member is extremely simple. Thus, for example, a pair of the clamping members of a supporting member which is first in a row of the supporting members are inserted in the supporting member without spreading the clamping members apart from each other. Then, the same process is repeated for the next following supporting member in the row. The beam and handrail connected thereto is slightly lifted so as to insert the next following pair of the clamping members in the above second supporting member. The above lifting does not affect the first pair of clamping members inserted in the first supporting member since the clamping members of the first pair after the inclination of the beam are moved relative to each other in the first supporting member. When all the clamping elements are hung in the T-shaped groove of the beam and inserted in the rejection supporting members, the handrail is lowered until the latter abuts against a front surface of the supporting member and, then, the clamping members are spread apart from each other.

The screw for spreading the clamping members apart from each other must be accessible from outside of the supporting member. For this purpose, a wall of the supporting member adjacent to the screw is provided with a slot of a respective width. In order to weaken an upper portion of the supporting member only to such a degree which does not exceed the necessary degree, the respective wall of the supporting member is provided with a through hole. The screw for spreading the clamping members apart from each other extends through the above through hole, which latter constitutes another feature of the present invention. A depth of insertion of one of the clamping members into the supporting member is changed insignificantly during inclining of the handrail, whereas the other clamping member is inserted deeper in the supporting member during such inclining as a result of the relative offset of their pin-shaped second portions. Thus, a location of the screw inserted in the first mentioned clamping member is only slightly changed relative to the supporting member during inclining the handrail so that a mounting location of the through hole is also only slightly changed. Therefore, it is sufficient when the through hole has a diameter only slightly exceeding the diameter of the screw so that the latter remains accessible from outside independently on the inclination of the handrail. If it is desirable to provide an essentially great adjustment of movement of the clamping part having the screw, the above through hole may be formed as an oblong hole.

Still another feature of the present invention is that two screws are provided for spreading the clamping members which screws are offset from each other in the direction of elongation of the supporting member. While only one screw is sufficient for spreading the clamping members, the provision of two screws is advantageous since this provides for a very specific spreading of the same. For instance, in this case a first screw which is screwed in an end portion of the clamping member spaced from the pin-shaped second portion can be first screwed in the same until the lower end portions of the clamping members abut against the inner surface of the supporting member. During this step the pin-shaped second portion located in the groove of the beam and engaging the same serves as a pivot. Then when an upper second screw is screwed in the clamping member, a supporting part of the lower first screw serves as a pivot relative to which latter the clamping members spread the pin-shaped second portions under the action of oppositely directed pressure. Then, the lower screw can be tigthened.

The above two screws may be also offset relative to each other in a direction transverse to the direction of elongation of the supporting member. In this case, the clamping members are so spread apart by means of a respective tightening of screws, that they are pivoted from each other about an axis located in a plane of the railing. One or both the above screws may be also located only at one side of the respective clamping member so that the clamping members during spreading apart are additionally pivoted about an axis parallel to the direction of elongation of the supporting member. The results attained by the above offset of the screws relative to each other in the transverse direction of the supporting member, can be also attained by screwing of the screws with a different strength. By such two-axial spreading of the clamping members apart from each other the pin-shaped second portions are additionally pivoted in a direction parallel to the direction of elongation of the beam while abutting against the respective wall of the T-shaped groove whereby a clamping contact is further improved.

Since the supporting member is often provided on its both sides parallel to a plane of railing with C-shaped portions each forming a groove for clamping connecting members, it is advantageous when the screw or the screws are located in a median plane extending between the pin-shaped second portions and transverse to face surfaces of the clamping members, that is transverse to the direction of elongation of the handrail. In this case, an access to the screws is provided through a slot formed by the C-shaped portions of the supporting member, and the above two-axial spreading of the clamping members is also attained, which is favorable for clamping the clamping members in the supporting members.

A transverse dimension of the first sections of the clamping members may exactly correspond to the transverse dimension of the hollow of the supporting member in which hollow the clamping members are inserted. However, the first sections may be so dimensioned that smaller or larger play is provided between the same and the walls of the supporting member. To provide pivoting the clamping members about an axis located in a plane of the railing on the lower end portion located in the supporting member without being pressed apart during tightening the screws, the lower end portion of one of the clamping members may be provided with an adhesive layer such as for instance, a small piece of a bilateral adhesive strip. Such strip can be engaged by the other clamping member so that the location of the adhesive strip serves as a pivot point for spreading apart the clamping members. The above adhesive layer, however, must not hinder longitudinal movability of the clamping members relative to each other.

Another advantageous possibility for a specific spreading of the clamping members is to provide an abutment section on the first portions of the clamping members so that the above sections are parallel to the direction of elongation of the groove and are located on those side surfaces of the clamping portions on which the pin-shaped second portions are located. When the clamping members abut with the abutment sections against the respective inner face surfaces of the supporting member during tightening of the screws, the abutment sections serve as pivots for spreading the clamping members. Spreading of the clamping members apart from each other relative to an axis located at an essentially great depth in the supporting member has the advantage that clamping between the clamping members and the supporting member is performed in a region of their abutment sections over lines where a closed contour of the hollow of the supporting member is slightly enlarged. This also better guarantees that the clamping parts are reliably clamped both in the supporting member and in the beam.

Still additional feature of the present invention is embodied in edge portions each provided on the respective clamping member below the pin-shaped second portion of the same and located in a plane which extends parallel to the direction of elongation of the supporting member and through the axis of the pin-shaped second portion. Each of the edge portions is formed by two inclined planes extending from the respective pin-shaped portion. The above construction further improves a clamping efficiency since this results in a clamping moment between the pin-shaped second portions and the edge portions, whereby the portion of the beam bounding the slot of the groove and located between the pin-shaped second portion and the edge portion is clamped therebetween. The inclined planes forming the edge portion provide for a possibility for a railing to be inclined at any desirable angle.

The clamping action perormed by the above construction is sufficient for reliably fixing the handrail. However, in the case when clamping action between the clamping members and the supporting member is substantially weak and does not prevent removing the clamping members from the supporting member, an additional shape-closed connection may be provided. The screw or screws for the spreading of the clamping members apart from each other may extend through a respective hole of a wall of the supporting member adjacent to the hollow of the latter. The above additional shape-closed connection of the handrail with the supporting member is thus performed by the clamping members having the screws and the pin-shaped second portions thereof.

The pin-shaped second portions of the clamping parts may be so dimensioned that in the spread position they engage only those inner surfaces of the T-shaped groove of the beam which extends at both sides of the slot of the groove. However, the pin-shaped second portions may also have such length that they are additionally clamped between vertical side surfaces of the T-shaped groove.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

A single FIGURE of the drawing is a perspective view of a railing and an arrangement for supporting the same, in accordance with the present invention.

DESCRIPTION OF THE PREFERRED EMBODIMENT

The drawing shows an arrangement provided for supporting a railing which latter comprises a handrail 9 and a beam 8 having a T-shaped groove 7 and a slot 14 communicating with the groove.

The arrangement for supporting the above railing includes a supporting member 1 having a box-shaped hollow portion 10 and two C-shaped portions 11 provided at those side walls of the hollow portion 10 which are parallel to the plane of the railing. Clamping blocks for connecting parts can be clamped in the above C-shaped portions 11. The supporting member 1 has a front surface 23 facing toward the handrail 9. A wall of the supporting member 1 adjacent to the hollow portion 10 is provided with two holes 19 and 20. The arrangement further includes a clamping element insertable into an upper portion of the supporting member 1 which clamping element comprises two clamping members 2 and 3. The upper end portions of the clamping members 2 and 3 projecting upwardly beyond the supporting member 1 form together a clamping head 6 which is to be clamped in the T-shaped groove 7 of the beam 8 of the handrail 9. The lower end portion of the clamping element has a transverse dimension which so corresponds to the inner transverse dimension of the hollow portion 10, that when the clamping members 2 and 3 are inserted in the supporting member 1 they are movable relative to each other. The clamping head 6 has upwardly extending arms 12 and 13 provided with pins 4 and 5 each projecting from one of the arms in a direction opposite to the direction in which the pin of the other arm projects. The clamping head 6 and the pins 4 and 5 form together a T-shaped member.

The pins 4 and 5 preferably are of a circular cross-section. As shown in the drawing, the pins 4 and 5 are offset relative to each other in a direction transverse to their axes and to the elongation of the supporting member 1, that is in the direction of elongation of the handrail 9. The pin 4 of the clamping member 2 is located on one side of its clamping member whereas the pin 5 of the clamping member 3 is located on the other side of its clamping member. The clamping head 6 is so dimensioned that both arms 12 and 13 located adjacent each other can pass through the slot 14 of the groove 7 of the beam 8, whereas the pins 4 and 5 can be inserted into the T-shaped groove. Upper marginal portions so the arms 12 and 13 are bevelled so that they enclose an acute angle with oppositely located longitudinal side surfaces of the clamping members. The pins 4 and 5 each are formed at an apex of the above acute angle. An edge portion 15 is provided on that side surface of each of the clamping members 2 or 3 having the pin 4 or 5 which edge portion is formed by two surfaces 16 and 16' inclined towards the lower end of the clamping member, and parallel to the axes of the pins 4, 5. An abutment section 24 may be provided on the same above side surfaces of the clamping members 2 and 3.

The clamping member 3 has two threaded through holes 17 and 18 having axes parallel to the axes of the pins 4 and 5. The axes of the through holes 17 and 18 extend a median plane which is located between the pins 4 and 5 and transverse to the plane of the railing. When the clamping members 2 or 3 are inserted in the supporting member 1, the threaded through holes 17 and 18 of the clamping member 3 align with the through holes 19 and 20 in the adjacent wall of the supporting member 1. One or two set screws can be screwed in the threaded holes 17 and 18 through the through holes 19 and 20 until the screws abut against the clamping member 2 which latter is solid and does not have any holes.

When the clamping members 2 and 3 with their pins 4 and 5 are inserted in the T-shaped groove 7 of the beam and in the hollow portion 10 of the supporting member 1, the beam can be inclined relative to the supporting member 1 at a desirable angle whereby the clamping members 2 and 3 move relative to each other in the direction of elongation of the supporting member 1. When the lower surface of the beam 8 lies on the front face surface 23 of the supporting member 1, the screws 21 and 22 are screwed in the threaded holes 17 and 18 through the through holes 19 and 20. By further screwing the screws 21 and 22, they abut against the clamping member 2 and spread the clamping members 2 and 3 apart from each other. Thus, the pins 4 and 5 are clamped in the T-shaped groove 7 and simultaneously the clamping members 2 and 3 are clamped in the supporting member 1. The lower surface of the beam 8 is thereby pressed against the front face surface 23 of the supporting member 1. By displacement of the plane defined by the axes of the screws relative to the pins 4 and 5 the latter additionally deviate from each other about a vertical axis so that clamping action is further improved. Since the edge portion 15 is spaced at a predetermined distance from the pins 4 and 5, the edge portion 15 is clamped on the lower surface of the beam 8 so that the portion of the beam bounding the slot 14 is spanned between the respective pin and edge portion. When the screws 21 and 22 extend in a spread position of the clamping members 2 and 3 through the through holes 19 and 20 of the supporting member 1, at least the clamping member 3 in which the screws are screwed is additionally secured to the supporting member 1 in a shape-closed manner. Therefore, the beam 8 of the handrail 9 is also secured in a shape-closed manner against removal from the supporting member 1 through the clamping member 3.

While specific construction of the arrangement in accordance with the present invention is shown in FIG. 1, it is understood that some modificaion of the same can be made within the limits of the subject matter of the invention.

For instance, the screws 21 and 22 may be offset relative to each other in a direction transverse to the direction of elongation of the supporting member. The screws 21 and 22 may be both located at one side of the clamping member 3. The lower end portion of one of the clamping members may be provided with an adhesive layer engageable by the lower end portion of the other clamping member. The pins 4 and 5 may have such lengths that they engage vertical side surfaces of the T-shaped groove 7. The pins 4 and 5 may be of a cross-section other than circular.

It will be understood that each of the elements described above, or two or more together, may also find a useful application in other types of constructions differing from the types described above.

While the invention has been illustrated and described as embodied in an arrangement for supporting a railing and the like, it is not intended to be limited to the details showm, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for supporting an elongated railing or the like which is provided with a longitudinal T-shaped groove and a slot communicating with said groove, comprising a supporting member having a longitudinally extending inner hollow; a T-shaped clamping element including two clamping members located adjacent one another, said clamping members each having a longitudinally extending first portion and a transversely extending pin-shaped second portion having an axis, the axis of one of said pin-shaped second portions being substantially parallel to but offset relative to the axis of the other pin-shaped second portion in a direction transverse to said axes thereof and to the elongation of said first portions, said first portions of said clamping elements being insertable in said hollow of said supporting member and movable relative to each other in the direction of elongation of said hollow, said pin-shaped second portions being insertable in the T-shaped groove of said railing; and means for spreading said clamping members apart from each other so as to thereby clamp said first portions in said supporting member and to clamp said pin-shaped second portions in the T-shaped groove of said railing.

2. The arrangement as defined in claim 1, wherein said railing includes a handrail and a beam supporting said handrail, the T-shaped groove and the slot communicating with the groove being formed in said beam.

3. The arrangement as defined in claim 1, wherein each of said pin-shaped second portions of said clamping members has a circular cross-section.

4. The arrangement as defined in claim 1, wherein one of said clamping members has at least one through hole extending in a direction substantially transverse the direction of elongation of said first portions, said spreading means including at least one screw extending into said hollow of said supporting member and through said through hole so as to abut against the other clamping member and to thereby spread said clamping members apart from each other.

5. The arrangement as defined in claim 4, wherein said one clamping member has at least one additional through hole which is offset relative to said one through hole in the longitudinal direction of said supporting member and extends in the direction substantially transverse to the same; said spreading means further including at least one additional screw extending into said hollow of said supporting member and through said additional through hole so as to abut against the other clamping mmeber in a location which is longitudinally offset relative to the location in which said one screw abuts against the same, and to thereby spread said clamping members apart from each other.

6. The arrangement as defined in claim 4, wherein each of said clamping members has a face surface facing towards the face surface of the other clamping member, and said clamping element having a median plane located between said pin-shaped second portions and extending in a direction transverse to said face surfaces of said clamping members and lengthwise of the elongation of said supporting member, said through hole and said screw each having an axis located in said median plane.

7. The arrangement as defined in claim 5, wherein each of said clamping members has a face surface facing towards the face surface of the other clamping member, and said clamping element having a median plane located between said pin-shaped second portions and extending in a direction transverse to said face surfaces of said clamping members and lengthwise of the elongation of said supporting member, said through holes and said screws having axes located in said median plane.

8. The arrangement as defined in claim 1, wherein each of said fist portions of said clamping members has at least one abutment section extending in a direction transverse to the direction of elongation of said supporting member and located on that side surface of the respective clamping member on which the pin-shaped second portion of said clamping member is located.

9. The arrangement as defined in claim 1, wherein each of said clamping members comprises an edge portion located in a plane passing substantially through the axis of the respective pin-shaped second portion and extending in a direction of the elongation of said supporting member, said edge portion being downwardly spaced from the respective pin-shaped second portion and extending parallel to the latter.

10. The arrangement as defined in claim 9, wherein each of said clamping members has two portions inclined from the respective pin-shaped second portion in directions opposite to each other and intersecting each other so as to form an intersection, said edge portion being formed by said intersection of said oppositely inclined portions.

11. The arrangement as defined in claim 5, wherein said hollow of said supporting member is bounded by wall portions, one of said wall portions adjacent to said one clamping member having two further holes adapted for extending said screws therethrough, said screws each extending through the respective further hole of said wall.

12. The arrangement as defined in claim 1, wherein said spreading means include a spreading screw, and one of said clamping members has a through hole for passing said screw therethrough, the other of said clamping member is solid but otherwise identical to said one clamping member.

* * * * *